United States Patent [19]
Dalrymple

[11] Patent Number: 4,911,219
[45] Date of Patent: Mar. 27, 1990

[54] POCKET DOOR FOR CURVED WALLED ENCLOSURES

[76] Inventor: Jerry M. Dalrymple, 11 Kensington, Conroe, Tex. 77304

[21] Appl. No.: 197,023

[22] Filed: May 20, 1988

[51] Int. Cl.$^4$ .............................................. E06B 5/00
[52] U.S. Cl. .................................... 160/118; 160/201; 160/202; 160/33; 160/37; 49/366; 49/372; 244/129.4; 244/129.5
[58] Field of Search ............... 160/117, 118, 201, 202, 160/32, 33, 37; 49/116, 118, 366, 372; 244/129.4, 129.5

[56] References Cited

U.S. PATENT DOCUMENTS

| | | | |
|---|---|---|---|
| 3,480,989 | 12/1969 | Edeus | 49/372 X |
| 4,072,179 | 2/1978 | Naito | 160/202 X |
| 4,114,674 | 9/1978 | Gabry | 160/202 X |
| 4,375,876 | 3/1983 | Stewart | 160/201 X |
| 4,597,549 | 7/1986 | Ryan | 160/37 X |

Primary Examiner—Ramon S. Britts
Assistant Examiner—David G. Kolman
Attorney, Agent, or Firm—Neal J. Mosely

[57] ABSTRACT

A laterally sliding pocket door is disclosed for use in curved walled enclosures such as airplanes, submarines, space shuttles, railroad cars, buses and the like, having a laterally extending divider comprising first and second hollow walls positioned on opposite sides with an open doorway tapered to be substantially wider at the top than at the bottom, and a pair of sliding door member assemblies, each positioned in one of the hollow walls, movable between a closed position meeting each other in said doorway and an open position retracted into the hollow walls. Each hollow wall has a curving guide track for pivotal movement of its sliding door assembly. Each sliding door member assembly comprises an upper, middle and a lower door member constructed and assembled in telescopic relation whereby the upper and lower door members telescope in relation to the middle door member during a pivoting lateral movement to permit the door member assembly to be opened beyond the point at which it would otherwise engage the upper portion of the curved side walls. Each sliding door member assembly has guide rollers cooperable with its guide track to guide the door members in telescoping movement during opening movement. An electric or fluid operated linear actuator moves the door member assemblies along their tracks between an open and a closed position.

19 Claims, 3 Drawing Sheets

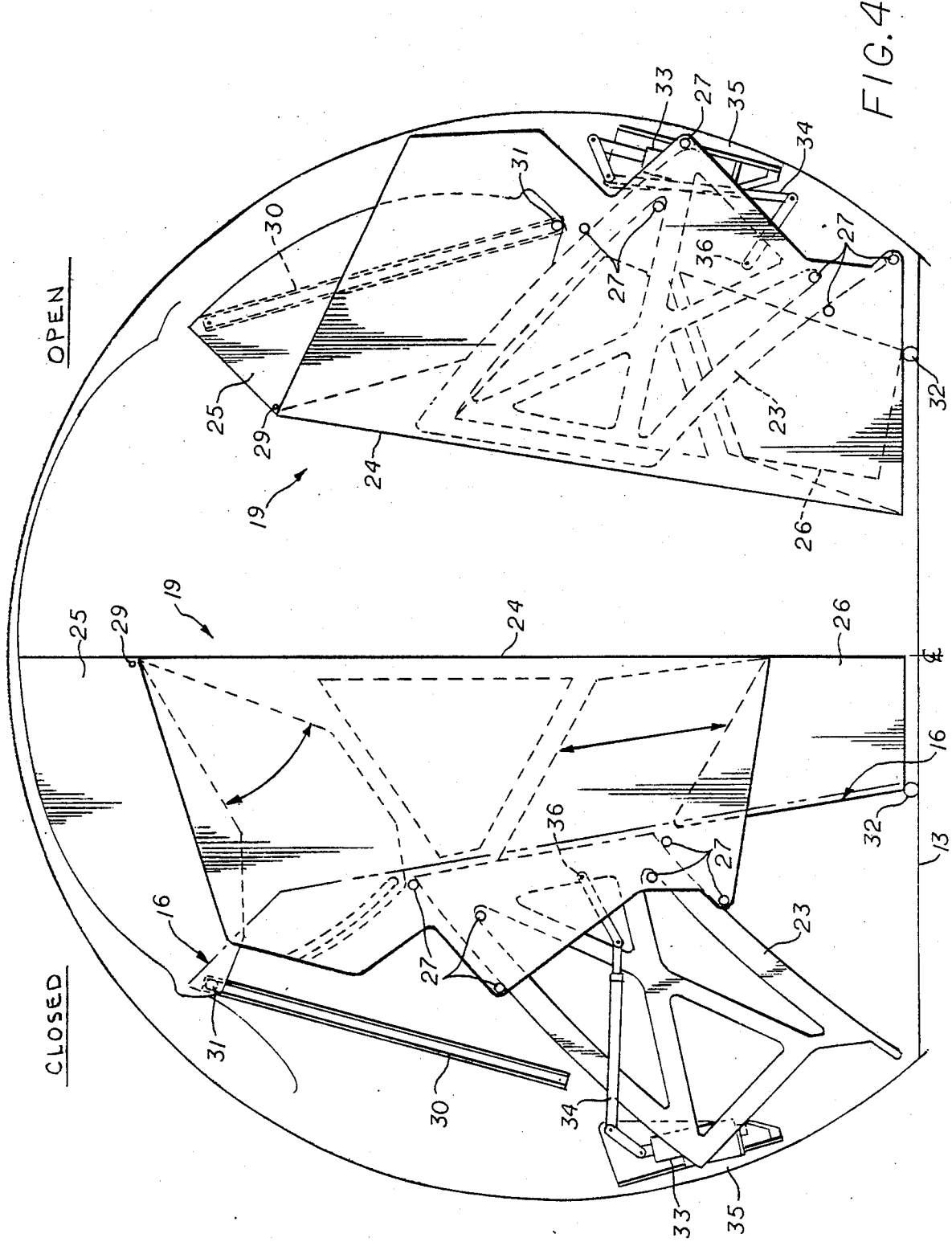

POCKET DOOR FOR CURVED WALLED ENCLOSURES

FIELD OF THE INVENTION

This invention relates generally to laterally sliding pocket doors for curved walled enclosures and more particularly to a pocket door providing a wider opening at the top than is permitted by the room available for lateral sliding movement of the door.

BACKGROUND OF THE INVENTION

Sliding doors, also known as pocket doors, are well known for use in spaces where there is insufficient space for opening a hinged door. In enclosures having curved side walls, such as airplanes, submarines, space shuttles, railroad cars, buses and the like, sliding doors are often used but have provided only a narrow doorway because of the limited movement permitted the doors before they engage the curved walls of the enclosure. Consequently, there has been a need for a sliding door for curved wall enclosures, such as airplanes, submarines, space shuttles, railroad cars, buses and the like, which can open wide enough to permit a more spacious view and which can be closed for privacy.

BRIEF DESCRIPTION OF THE PRIOR ART

The patent literature discloses a number of types of sliding doors and other doors used in airplanes and the like but none which solve the problems discussed above.

Ostermann U.S. Pat. No. 842,969 discloses a grain door with pivotally movable plates which are opened for removal of grain from storage.

Thorn U.S. Pat. No. 1,547,083 discloses an automobile with a pivotally sliding door for entrance of the driver or passenger.

Cope U.S. Pat. No. 1,570,462 discloses hog pen with sliding panels which open and close the door opening.

Bonzer U.S. Pat. No. 3,238,995 discloses an airplane hanger with doors which combine sliding and pivotal movement.

Baker U.S. Pat. No. 4,176,812 discloses a mid-cabin door with steps for an airplane which opens and closes along a guide track.

Stewart U.S. Pat. No. 4,375,876 discloses a sliding exterior door for an airplane where the door slides into the roof of the airplane.

These patents and other known prior art do not disclose a sliding door of the type described and claimed below, that is, a laterally sliding pocket door for use in curved walled enclosures such as airplanes, submarines, space shuttles, railroad cars, buses and the like, having a laterally extending divider comprising first and second hollow walls positioned on opposite sides with an open doorway tapered to be substantially wider at the top than at the bottom, and a pair of sliding door member assemblies, each positioned in one of the hollow walls, movable between a closed position meeting each other in said doorway and an open position retracted into the hollow walls. Each hollow wall has a guide track for its sliding door assembly. Each sliding door member assembly comprises an upper, middle and a lower door member constructed and assembled in telescopic relation whereby the upper and lower door members telescope in relation to the middle door member during pivotal movement of the middle door member to permit the door member assembly to be opened beyond the point at which it would otherwise engage the upper portion of the curved side walls. Each sliding door member assembly has guide rollers cooperable with its guide track to guide the door members in telescoping movement during pivotal opening movement. An electric or fluid operated linear actuator moves the door member assemblies along their tracks between an open and a closed position.

SUMMARY OF THE INVENTION

It is therefore a general object of this invention to provide a new and improved sliding pocket door for use in curved walled enclosures such as airplanes, submarines, space shuttles, railroad cars, buses and the like.

It is another object of the present invention to provide a new and improved sliding pocket door assembly for use in curved walled enclosures such as airplanes, submarines, space shuttles, railroad cars, buses and the like which permits the door to open to a wider door opening than has heretofore been possible.

It is another object of this invention to provide a new and improved automatic opening sliding pocket door assembly for use in curved wall enclosures such as airplanes, submarines, space shuttles, railroad cars, buses and the like which permits the door to open to a wider door opening than has heretofore been possible.

It is another object of this invention to provide a new and improved sliding pocket door assembly for use in curved wall enclosures such as airplanes, submarines, space shuttles, railroad cars, buses and the like which permits the door member assembly to be opened beyond the point at which it would otherwise engage the upper portion of the curved side walls.

It is another object of this invention to provide a new and improved sliding pocket door assembly for use in curved wall enclosures such as airplanes, submarines, space shuttles, railroad cars, buses and the like having a laterally extending divider with hollow walls positioned on opposite sides of an open doorway and a pair of sliding door member assemblies, each positioned in one of the hollow walls, movable between a closed position meeting each other in said doorway and an open position retracted into the hollow walls, the door assembly having telescoping door members which telescope during pivotal opening to permit the door member assembly to be opened beyond the point at which it would otherwise engage the upper portion of the curved side walls.

It is another object of this invention to provide a new and improved sliding pocket door assembly for use in curved walled enclosures such as airplanes, submarines, space shuttles, railroad cars, buses and the like having a laterally extending divider with hollow walls positioned on opposite sides of an open doorway and a pair of sliding door member assemblies, each positioned in one of the hollow walls, movable between a closed position meeting each other in said doorway and an open position pivotally retracted into the hollow walls, the door assembly having telescoping door members which telescope during opening to permit the door member assembly to be opened beyond the point at which it would otherwise engage the upper portion of the curved side walls, the door members being moved along curved tracks inside the hollow walls by a linear motor operator.

It is another object of this invention to provide a new and improved automatic opening sliding pocket door assembly for use in curved walled enclosures such as airplanes, submarines, space shuttles, railroad cars, buses and the like which is simple and inexpensive to manufacture, install and use.

Other objects of the invention will become apparent from time to time throughout the specification and claims as hereinafter related.

The above noted and other objects of the invention are accomplished by a laterally sliding and pivoting pocket door for use in curved walled enclosures such as airplanes, submarines, space shuttles, railroad cars, buses and the like, having a laterally extending divider comprising first and second hollow walls positioned on opposite sides with an open doorway tapered to be substantially wider at the top than at the bottom, and a pair of sliding door member assemblies, each positioned in one of the hollow walls, movable between a closed position meeting each other in said doorway and an open position retracted into the hollow walls. Each hollow wall has a curved guide track for its sliding door assembly. Each sliding door member assembly comprises an upper, middle and a lower door member constructed and assembled in telescopic relation whereby the upper and lower door members telescope in relation to the middle door member during lateral and/or pivotal movement to permit the door member assembly to be opened beyond the point at which it would otherwise engage the upper portion of the curved side walls. Each sliding door member assembly has guide rollers cooperable with its guide track to guide the door members in telescoping movement during opening movement. An electric or fluid operated linear actuator moves the door member assemblies along their tracks pivotally between an open and a closed position.

BRIEF DESCRIPTION OF THE DRAWINGS

FIG. 4 is a view in front elevation of the door and operating mechanism of FIG. 3 installed and showing both the open and closed positions of the door assembly.

DESCRIPTION OF THE PREFERRED EMBODIMENT

Sliding doors, also known as pocket doors, are well known for use in spaces where there is insufficient space for opening a hinged door. In enclosures having curved side walls, such as airplanes, submarines, space shuttles, railroad cars, buses and the like, sliding doors are often used but have provided only a narrow doorway because of the limited movement permitted the doors before they engage the curved walls of the enclosure.

Figure 1:
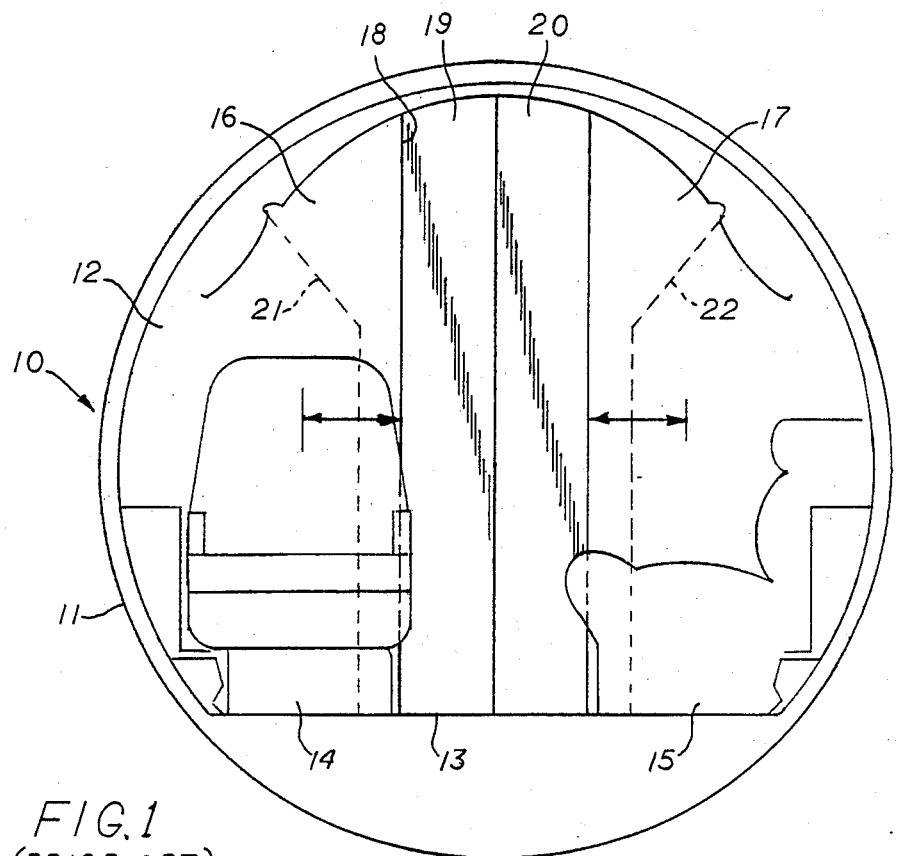
FIG. 1 is a view in elevation of a prior art sliding pocket door assembly for dividing the interior of an airplane for privacy.

In FIG. 1, there is shown an interior view of an airplane showing the location of and the limitations of a sliding door dividing the interior of the plane. The body 10 of the airplane is shown as having a substantially cylindrical wall 11 defining an enclosure with curved bottom, side and top walls. The passenger compartment 12 has a floor 13 with seats 14 and 15 supported thereon. Compartment 12 has a pair of hollow walls 16 and 17 which define a doorway 18 closed by a pair of sliding doors 19 and 20 which meet when closed and can be opened by lateral movement into the walls. The size of doorway 18 is limited by the amount of movement permitted the doors 19 and 20 before they abut the side walls of the airplane and are stopped.

Behind the doorway 18, dotted lines 21 and 22 show a hidden divider which has a wider opening than the doorway is flared outward at the top to provide a wide opening giving a more spacious view of the interior. Dotted lines 21 and 22 are shown for purposes of illutration only and do not represent any part of this invention. These lines merely show how spacious the view is through a wide open divider and how this invention can provide a similar view. The view in FIG. 1 illustrates the need for a sliding door for curved wall enclosures, such as airplanes, submarines, space shuttles, railroad cars, buses and the like, which can open wide enough to permit a more spacious view and which can be closed for privacy.

Figure 2:
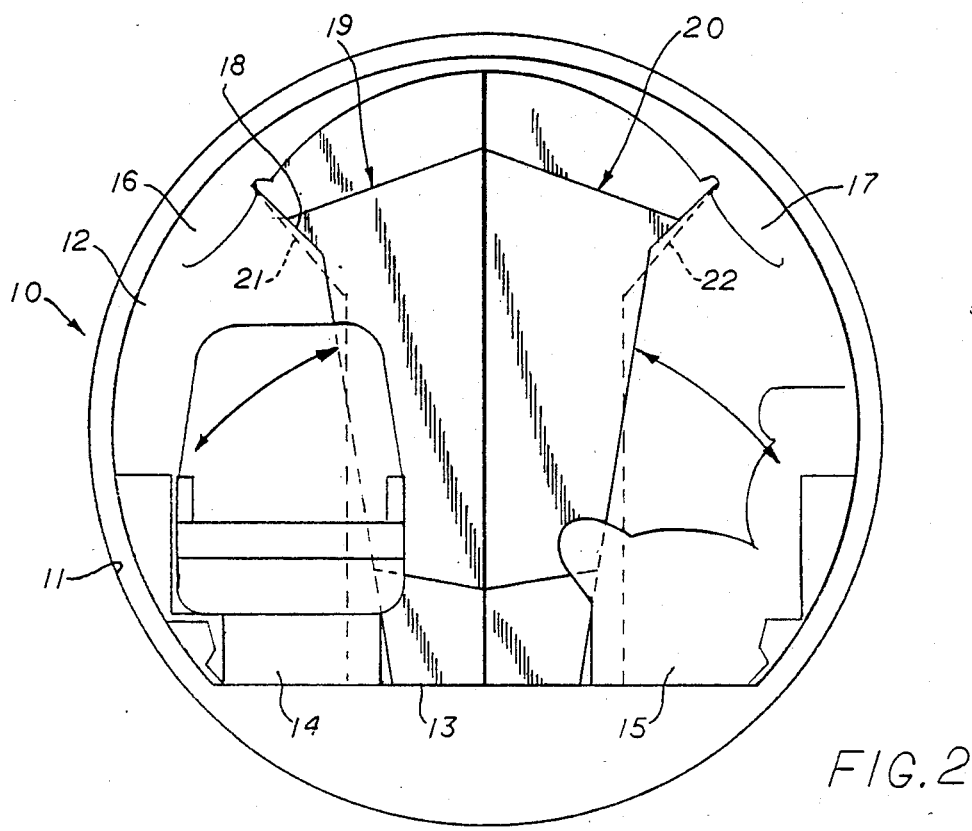
FIG. 2 is a view in elevation of a preferred embodiment of this invention comprising a sliding pocket door assembly for dividing the interior of an airplane for privacy which permits a larger top opening than is permitted by the room available for lateral sliding movement of the door.

In FIG. 2, there is shown a preferred embodiment of this invention which provides a laterally sliding and pivoting pocket door disclosed for use in curved walled enclosures such as airplanes, submarines, space shuttles, railroad cars, buses and the like, having a laterally extending divider comprising first and second hollow walls positioned on opposite sides with an open doorway tapered to be substantially wider at the top than at the bottom, and a pair of sliding door member assemblies, each positioned in one of the hollow walls, movable between a closed position meeting each other in said doorway and an open position retracted into the hollow walls. The sliding doors have a telescopic construction such that the doors can be pivoted opened wide enough to permit a more spacious view and which can be closed for privacy.

The embodiment of FIG. 2 utilizes certain structure in common with the prior art shown in FIG. 1 and common parts are given the same reference numerals. The body 10 of the airplane is shown as having a substantially cylindrical wall 11 defining an enclosure with curved bottom, side and top walls. The passenger compartment 12 has a floor 13 with seats 14 and 15 supported thereon. Compartment 12 has a pair of hollow walls 16 and 17 which define a doorway 18 which tapers outwardly from bottom to top and is closed by a pair of pivotally sliding doors 19 and 20 of telescopic construction which meet when closed and can be opened by lateral, pivotal movement into the walls. The size of doorway 18 is substantially wider than doorway 18 of FIG. 1 because of the curver lateral tracking and telescopic construction of doors 19 and 20 which permits substantially greater movement before they abut the side walls of the airplane and are stopped. In this embodiment, doorway 18 is nearly the same size and shape as the opening defined by dotted lines 21 and 22 of the reference divider and is flared outward at the top to provide a wide opening giving a more spacious view of the interior.

Figure 3:
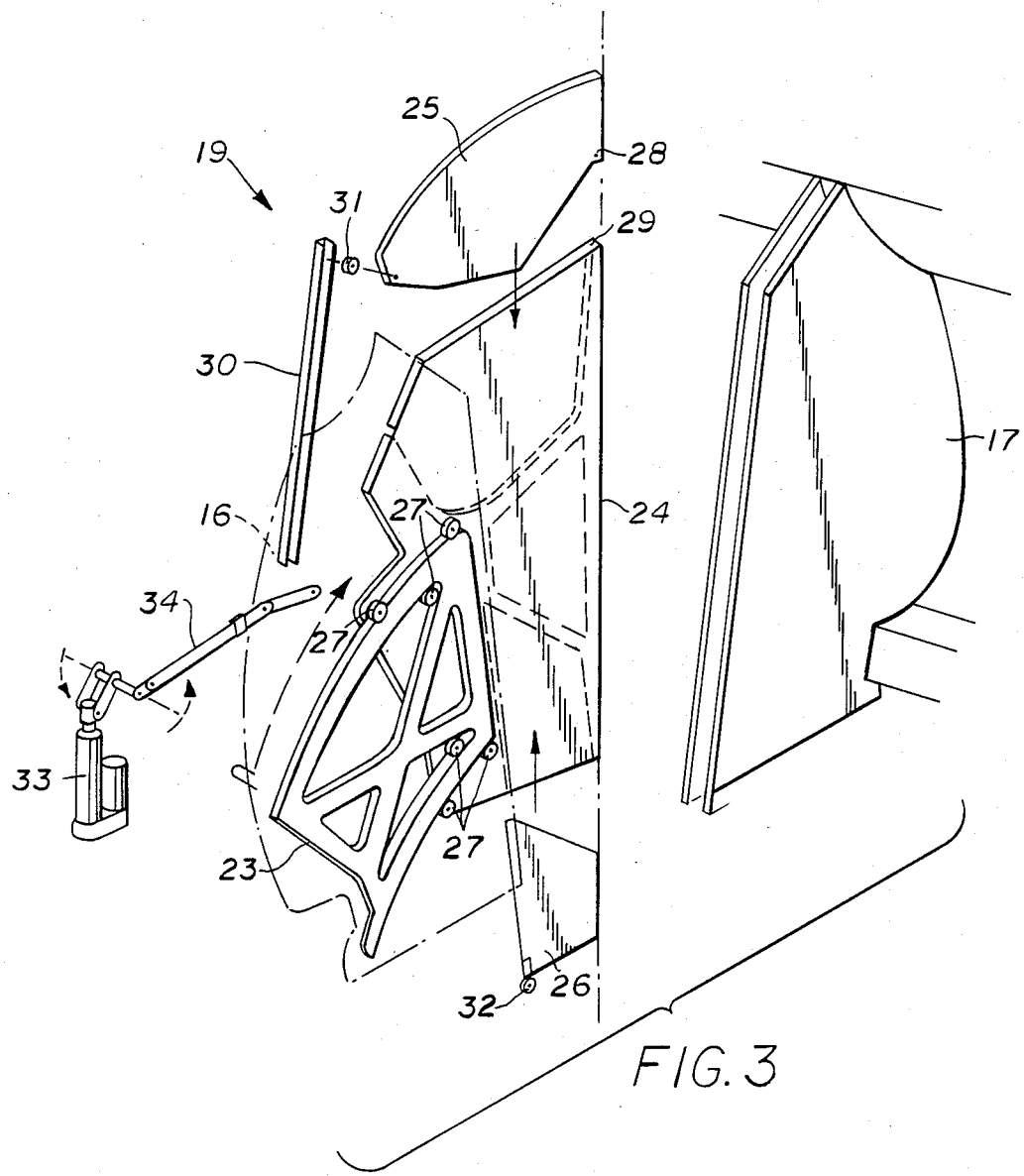
FIG. 3 is an exploded, partially isometric view of the door shown in FIG. 1 showing the parts of the door and operating mechanism.

In FIGS. 3 and 4, shown details of construction and operation are shown of the improved sliding door assembly of FIG. 2. Hollow wall 17 is shown in full line (FIG. 3) without the door assembly installed. Hollow wall 16 is shown in dotted line (FIG. 3) with full details of door assembly 19.

Hollow wall 16 has door assembly 19 mounted for movement therein. A slide or guide track 23 is mounted in a fixed position inside hollow wall 16 to guide the movement of the component parts of door assembly 19. The door assembly 19 comprises three door members, a center member 24, an upper member 25 and a lower member 26. Center door member 24 is hollow and has a plurality of guide rollers 27 which ride on guide track 23 to direct the movement of the door along a desired path.

Upper door member 25 is pivotally connected at 28 and 29 by a pivot pin (not shown). Door member 25 fits the curvature of the wall 11 of the cabin in the door closed position. A second guide track 30 is mounted on the hollow wall 16 and receiver guide roller 31 on upper door member 25. Bottom door member 26 fits slidably in the bottom of center door member 24 and rides along the floor on a roller 32. The door assembly is moved between closed and open position by a linear actuator 33 (air or hydraulic or electrical) through a bell-crank linkage 34 connected to center door member 24. Manual operation is also feasible. The other door assembly 20 consists of parts and rides on a guide track and is operated by an actuator which are the same as just described but in mirror image relation.

In FIG. 4, the door assemblies are shown in closed and open positions. Door assembly 19 is shown to the left of the vertical center line in a closed position. The component parts, guide track and actuator are shown in an installed position as compared to the exploded view in FIG. 3. To the right of the vertical center line, the door assembly 20 is shown in open position and will be described more fully in the description of operation. Upper door member 25 is pivotally connected to center door member 24 and has its closed position against the ceiling portion of wall 11. Guide roller 31 is positioned in guide track 30. The lower door member 26 is positioned, by gravity, against the floor and supported for sidewise movement on roller 32.

Curved guide track 23 is secured on one side of hollow wall 16. Center door member 24 has its guide rollers 27 positioned against guide track 23 for movement therealong. Actuator 33 is mounted on supporting bracket 35 and is connected by linkage 34 to center door member 24 as at 36.

OPERATION

The operation of this door assembly should be apparent from the foregoing description but will be restricted with reference to the operation between the closed and open positions in FIG. 4.

In the closed position, described above with reference to FIG. 4, door assembly 19 is closed against door assembly 20 at the vertical center line. Door assembly 19 has upper door member 25 extended against the ceiling wall of the cabin and lower door member 26 resting on the floor 13. The three door members 24, 25 and 26 provide a unitary door structure.

Actuation of the actuator 33 causes bell-crank linkage 34 to rotate to the position seen to the right of the vertical center line in FIG. 4, which is the fully opened position. As actuator 33 rotates linkage 34, center door member 24 is pivotally retracted into hollow wall 16 along curved guide track 23. During this movement of door member 24, upper door member 25 moves roller 31 in guide track 30 to retract pivotally inside door member 24. Simultaneously, movement of the door member 24 moves lower door member 26 sideways on roller 32 and lower door member 26 telescopes upward inside center door member 24. When door actuator 33 is operated in the reverse direction, the door assembly moves to the closed position along the guide tracks 23 and 30.

While this invention has been described fully and completely with reference to a single preferred embodiment it should be understood that within the scope of the appended claims the invention may be practiced otherwise than as specifically described.

I claim:

1. A sliding, pocket door assembly for an enclosure having vertically curved side walls,
   a laterally extending divider comprising first and second hollow walls positioned on opposite sides of said enclosure with an open doorway therebetween,
   a pair of sliding door member assemblies, each positioned in one of said hollow walls, movable between a closed position meeting each other in said doorway and an open position pivotally retracted into said hollow walls, in which
   each said sliding door member assembly comprises an upper, middle and a lower door member constructed and assembled in telescopic relation with each other and including means for causing said upper and lower door members to telescope in relation to said middle door member during lateral movement of said door assembly to permit the door member assembly to be opened beyond the point at which the upper door member would engage the upper portion of the side wall of said space,
   said doorway being of a size and shape permitting each of said hollow walls to fully receive its door member assembly when moved to a fully opened position.

2. A sliding, pocket door assembly according to claim 1 wherein
   said means includes a kinetic energy source for moving said door member assemblies between an open and a closed position.

3. A sliding, pocket door assembly according to claim 1 including
   motor means for moving said door member assemblies pivotally between an open and a closed position.

4. A sliding, pocket door assembly according to claim 3 in which
   said motor means comprises an electric or fluid operated linear actuator.

5. A sliding, pocket door assembly according to claim 1 in which
   one of said door members telescopes vertically inside the other.

6. A sliding, pocket door assembly according to claim 1 in which
   one of said door members telescopes pivotally inside the other.

7. A sliding, pocket door assembly according to claim 1 in which
   said doorway is substantially wider at the top than at the bottom.

8. A sliding, pocket door assembly according to claim 1 in which
   said doorway is substantially wider at the top than at the bottom, and
   one of said door members telescopes vertically inside the other.

9. A sliding, pocket door assembly according to claim 1 in which
said doorway is substantially wider at the top than at the bottom, and
one of said door members telescopes pivotally inside the other.

10. A sliding, pocket door assembly according to claim 1 in which
said doorway is tapered to be substantially wider at the top than at the bottom, and
each said door member assembly slides laterally and pivotally into its hollow wall and the upper one of said door members telescopes pivotally inside the other.

11. A sliding, pocket door assembly according to claim 1 in which
each of said hollow walls includes a curved guide track for said sliding door assemblies,
each said sliding door member assembly has guide members supported thereon and cooperable with its guide track to guide said upper and lower door members in pivotal telescoping movement as said door member assembly is opened.

12. A sliding, pocket door assembly according to claim 1 in which
each of said hollow walls includes a curved guide track for said sliding door assemblies,
each said sliding door member assembly has guide members supported thereon and cooperable with its guide track to guide said upper and lower door members in telescoping movement as said door member assembly is opened, and
motor means for moving said door member assemblies along said tracks between an open and a closed position.

13. A sliding, pocket door assembly according to claim 1 in which
each of said hollow walls includes a guide track for said sliding door assemblies,
said doorway is tapered to be substantially wider at the top than at the bottom,
each said sliding door member assembly has guide members supported thereon and cooperable with its guide track to guide said upper and lower door members in telescoping movement as said door member assembly is opened,
each said door member assembly slides laterally and pivotally into its hollow wall and the upper one of said door members telescopes pivotally inside the other, and
motor means for moving said door member assemblies along said tracks between an open and a closed position.

14. A sliding, pocket door assembly according to claim 13 in which
each of said sliding door member assembly guide members comprises a roller cooperable with its curved guide track to guide said upper and lower door members in pivotal telescoping movement as said door member assembly is opened.

15. A sliding, pocket door assembly according to claim 1 in which
each of said hollow walls includes a curved guide track for said sliding door assemblies,
said doorway is tapered to be substantially wider at the top than at the bottom,
each said sliding door member assembly has guide members supported thereon and cooperable with its guide track to guide said upper and lower door members in telescoping movement as said door member assembly is pivoted open,
each said door member assembly slides laterally and pivotally into its hollow wall and the upper one of said door members telescopes pivotally inside the other, and
motor means for moving said door member assemblies along said tracks between an open and a closed position.

16. A sliding, pocket door assembly according to claim 15 in which
each of said sliding door member assembly guide members comprises a roller cooperable with its curved guide track to guide said upper and lower door members in telescoping movement as said door member assembly is pivoted open.

17. A sliding, pocket door assembly according to claim 15 including
motor means comprising an electric or fluid operated linear actuator for moving said door member assemblies between an open and a closed position.

18. A sliding, pocket door assembly according to claim 17 in which
each of said sliding door member assembly guide members comprises a roller cooperable with its guide track to guide said upper and lower door members in telescoping movement as said door member assembly is opened.

19. A sliding, pocket door assembly for an enclosure having vertically curved side walls,
a laterally extending divider comprising first and second hollow walls positioned on opposite sides of said enclosure with an open doorway therebetween,
a pair of sliding door member assemblies, each positioned in one of said hollow walls, movable between a closed position meeting each other in said doorway and an open position retracted into said hollow walls, in which
each of said hollow walls includes a curved guide track for said sliding door assemblies,
said doorway is tapered to be substantially wider at the top than at the bottom,
each said sliding door member assembly comprises an upper, middle and a lower door member constructed and assembled in telescopic relation with each other and including means for causing said upper and lower door members to telescope in relation to said middle door member during lateral movement of said door member assembly to permit the door member assembly to be pivoted open beyond the point at which the upper door member would engage the upper portion of the walls of said space,
each said sliding door member assembly means having guide members comprising a roller cooperable with its curved guide track to guide said upper and lower door members in telescoping movement as said door member assembly is opened,
each said door member assembly slides laterally and pivotally into its hollow wall and the upper one of said door members telescopes pivotally inside the middle door member and the lower door member slides inside the middle door member,
said lower door member having a roller on its lower edge facilitating its movement along the floor during opening movement of said sliding door assembly, said doorway being of a size and shape permitting each of said hollow walls to fully receive its door member assembly when moved to a fully opened position, and motor means comprising an electric or fluid operated linear actuator for moving said door member assemblies along said tracks between an open and a closed position.

* * * * *